E. R. HEWITT.
TIRE.
APPLICATION FILED AUG. 28, 1909.
1,110,541. Patented Sept. 15, 1914.
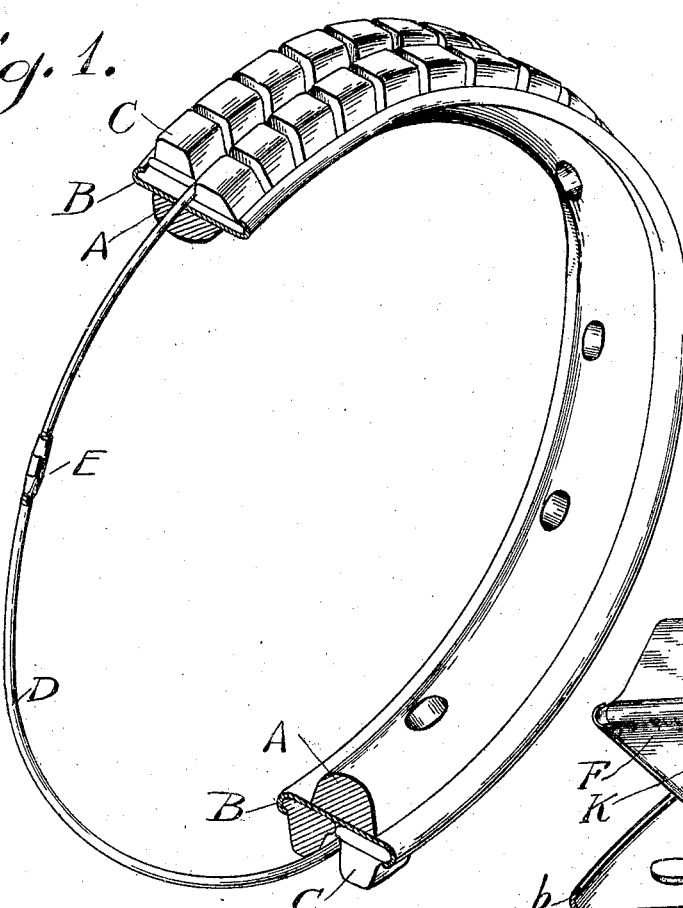
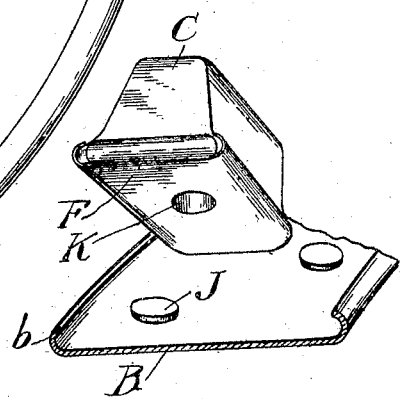
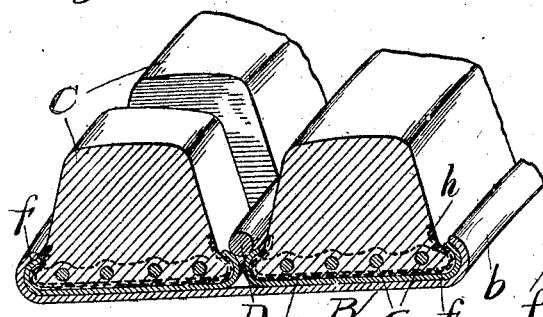
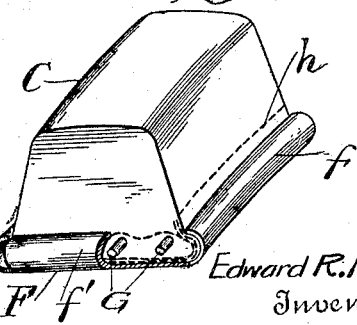
Edward R. Hewitt.
Inventor

UNITED STATES PATENT OFFICE.

EDWARD R. HEWITT, OF RINGWOOD, NEW JERSEY, ASSIGNOR TO HEWITT MOTOR COMPANY, OF NEW YORK, N. Y., A CORPORATION OF NEW YORK.

TIRE.

1,110,541.      Specification of Letters Patent.      Patented Sept. 15, 1914.

Application filed August 28, 1909. Serial No. 515,017.

*To all whom it may concern:*

Be it known that I, EDWARD R. HEWITT, a citizen of the United States, and a resident of Ringwood, in the county of Passaic, State of New Jersey, have invented certain new and useful Improvements in Tires, of which the following is a specification, reference being had to the accompanying drawings.

My invention relates to tires, and more particularly to features of construction and arrangement whereby they may be more rapidly attached to or detached from wheels for replacement or repair, with the object of economy and efficiency in the use of wheels equipped therewith. The particular advantages will appear from a detailed description of my invention in connection with the drawings forming a part thereof.

Figure 1 shows a felly of a wheel omitting spokes and hub, with the tire on the felly, part of which is cut away for purposes of illustration. Fig. 2 shows a small section of a rim and tire, embodying my invention. Fig. 3 shows one form of a block or unit. Fig. 4 shows a rim with a tire block lifted from its normal position, showing a feature of attachment which may be employed if desirable.

A is the felly; B is the rim; C are blocks or units sometimes called "buns"; D is a wire or rod; E is a turnbuckle uniting the ends of said wire D; F is a base for the block C; $f$ is the upturned side of said base; $f'$ is the upturned and overturned end of the base F; G are wires embedded in block C; H is fabric likewise embedded or molded into and on the base of block C; $h$ is a portion of one ply of fabric on the face of the unit; J is a projection or dowel on the rim B; and K is a corresponding depression or recess in the base F of block C.

The particular form of construction in which I have chosen to illustrate the embodiment of my invention comprises the felly A such as is ordinarily attached to the spokes of a wheel at their extremities, and the rim B which is secured on the felly in any usual manner. The rim B has lateral beads or clenches $b$. Individual units or blocks E sometimes called "buns" are made preferably of rubber or any desired resilient compound suitable for use in the form of solid tires. In the base of each block C are metal reinforcing rods G, while several plies of fabric are incorporated in the rubber and may be laid so as to reach into the body of rubber comprising the block C to a greater or less extent and around the rods G. One of the plies may extend partially up the faces of the blocks as shown at $h$. Each block or unit has the fabric and metal rods molded or vulcanized therewith so as to form an integral member. The base of this member is molded so as to present a lateral protrusion around the entire periphery of the block. Such end protrusions may be formed by extending the ends of the rods beyond the body portion of each block. The base thus formed receives an independent metallic base member F which may be detachably secured to the integral base by opposing flanges $f, f$ and $f', f'$ formed on the sides and ends respectively of the metallic base. The total width of the bases of the completed unit blocks made in this fashion is equal to the width of the rim B between the concavities of the two clencher edges $b$. The blocks are then inserted by passing one side or bead $f$ of their base F under the edge of the clencher edge or bead $b$ of the rim B, and then bringing them to a base-contact with the body of the rim B. When in this position the securing rod D is adjusted over the contiguous beads $f$, of adjacent blocks. By contracting rod D by means of the turnbuckle E a wedging action is produced and the base plates F of the blocks C are forced apart and their outer beads come into a close locking engagement with the rim B on the felly.

In order to prevent creeping or circumferential movement, owing to the tractive effort on the driving wheels, I prefer in some cases to embody positive means, one form of which is illustrated in Fig. 4, in which projections or dowels such as J are stamped up from the rim B, or may be made in any other suitable manner, and the recess or depression K is made in the base F of block C, so that by registering of the dowel J with the depression K, circumferential movement of the blocks will be prevented when they are held down upon the rim B after the locking engagement above referred to, brought about by contracting the fastening wire D.

In the construction described it may be seen that the blocks C with the individual base can be readily made in quantity, are small units which can be easily handled, are comparatively cheap, and can be replaced individually and singly for repairing a tire instead of the necessity of replacing the complete tire. By the use of the single contracting fastening rod or wire D in combination with the blocks, shown and described, I afford a simple and effective means for quick removal and replacement of any block or of the complete tire. The base of each block may be made of a steel-stamping, which is simple and cheap to produce. By my design of the base for the individual block I secure a stiff construction by means of the upturned edges, which at the same time accomplishes the further purpose of securing the rubber portion of the block to its base. I may make the dowels a tight fit or a snap fit so that each block is held in place during assembling and before the securing wire is put in place.

While I have shown one form of construction and specifically described it to illustrate my invention, I may make many modifications in arrangement or design, without departing from the spirit of my invention, but

What I claim and desire to secure by Letters Patent is:—

1. In combination with a clencher rim, a tire composed of a plurality of interchangeable blocks provided with relatively rigid bases disposed on the rim in a plurality of circumferential rows between the clenchers, the total transverse width of the base members of the rows of blocks being equal substantially to the width of the rim, and adjustable means disposed operatively between the base members of adjacent rows of blocks to force the same into locking engagement with the clenchers of the rim.

2. In combination with a clencher rim, a tire composed of a plurality of interchangeable blocks provided with relatively rigid bases having yielding treads and disposed on the rim in a plurality of circumferential rows between the clenchers, the total transverse width of the base members of the rows of blocks being equal substantially to the width of the rim, a circumferential rod disposed operatively between the base members of adjacent rows of blocks and means to take up on said rod to force the blocks into locking engagement with the clenchers of the rim.

3. In a sectional or block tire, a unit including a rubber body portion, fabric molded in the base thereof, a plurality of rods near the base thereof projecting beyond the main portion of the block, a metal base covering the bottom of said block, upturned edges on said base embracing or clenching protruding base extensions of said rubber blocks and embracing the projecting ends of said rods.

4. In a sectional or block tire separate rubber sections, a flat metallic base for each rubber section having upturned sides affording permanent attachment to the section, stiff material embedded in the base of said sections and in part projecting therefrom and engaged by the upturned edges of said sections, means on the base of each section and means on the face of the rim having a tight fit with the means on the base of each block whereby the latter may be held in temporary position for assembling.

In testimony whereof I have signed my name to this specification at the borough of Manhattan, city and State of New York, on the 26th day of August 1909, in the presence of two subscribing witnesses.

EDWARD R. HEWITT.

Witnesses:
 FRANK ACKERMAN,
 JOHN M. CONNERY.

---

Copies of this patent may be obtained for five cents each, by addressing the "Commissioner of Patents, Washington, D. C."